United States Patent Office 3,304,348
Patented Feb. 14, 1967

3,304,348
HEAT SETTABLE BUTADIENE-STYRENE COMPOSITIONS FOR PROTECTIVE COATINGS COMPRISING PHOSPHORIC ACID AND A POLYCARBOXYLIC ACID ANHYDRIDE
Joseph G. Svrchek, Hinsdale, Ill., assignor, by mesne assignments, to W. R. Grace & Co., New York, N.Y., a corporation of Connecticut
No Drawing. Filed Oct. 25, 1963, Ser. No. 318,817
4 Claims. (Cl. 260—894)

The present invention relates to improvements in compositions intended for application to metallic surfaces to provide them with impervious, protective coatings. While the compositions of the present invention are useful in protecting many types of articles against mechanical damage, corrosion, and the like, they are particularly useful in the field of coating pipes which are to be buried underground.

The most widely used method for protecting pipe which is to be buried underground involves the application of hot coatings such as coal tar, asphalt, or wax to the surface of the pipe followed by a spiral wrap. While these coating systems use relatively inexpensive raw materials, a substantial amount of labor is involved in applying them to the pipe. Despite this relatively high cost, the protection which such coating and wrapping systems afford is not as substantial as would be desirable. The chemical and electrical properties of such coatings on pipe are not completely satisfactory and corrosion of the piper occurs with sufficient frequency that this method of pipe protection is less than completely satisfactory. Hot applied coating systems are also liable to damage in transport, and damage by backfill materials used on the job site. The coatings are also subject to damage by bending of the pipe prior to laying, and are subject to disbonding because of weather extremes or soil stresses.

Significant improvements in the protection of pipe which is to be buried underground have been achieved in recent years through the application of heat reactive resins, specifically of the butadiene-styrene copolymer types. A process for applying such copolymers has been described in U.S. Patent No. 3,028,257 issued August 3, 1962 and assigned to the same assignee as the present application. That patent describes the application of heat reactive polymers by spraying the partly polymerized copolymer with a flammable liquid diluent at a temperature above the flash point of the diluent to atomize the composition, whereupon the resulting spray is directed through an envelope of flame and heat directed at the surface to be coated. While in the zone of flame and heat, the polymerization of the copolymer continues at a rapid rate so that shortly after application of the copolymer to the surface in the form of a continuous film, the copolymer is completely set to an infusible coating.

Still another method of application of the copolymers involves spraying or otherwise applying the partly polymerized material in the form of an extremely thin film and then immediately subjecting the thin coating to the curing action of an open flame so that the thin coating is rendered immobile and receptive to subsequent applied thin films. Through a succession of such application and curing steps, following in relatively rapid sequence, a satisfactory thickness of the copolymer can be built-up without the problems of delamination which would occur if a relatively thick coating of the copolymer were applied to the surface initially.

While the coatings thus applied to the pipe have been found to be completely satisfactory from the standpoint of resistance to ordinary corrosion and biological attack, some difficulties have been encountered when pipes coated in this manner have been additionally protected by means of cathodic protection devices. In the usual application of cathodic protection, the metal to be protected is electrically connected to the negative terminal of a source of current such as a rectifier, generator, or battery. The positive terminal is connected to an anode in the corrosive electrolyte. Current from the anode passes through the electrolyte to the protected metal, making it cathodic and reversing the current at the anodes of local cells formed on the protective metal. When such cathodic protection systems are employed with pipes having the aforementioned copolymer coating on them, it sometimes results in a disbonding of the coating from the surface of the pipe particularly in areas where the applied potential is reasonably high. This disbonding, of course, can promote exposure of the surface of the pipe to the corrosive elements which the coating was designed to protect against thereby nullifying the advantages derived from the coating.

It is accordingly an object of the present invention to provide an improved composition for application to metallic surfaces which is highly resistant to cathodic disbonding when the coated surfaces are employed in a system of cathodic protection.

Still another object of the invention is to provide an improved composition for application to pipes and the like which are to be buried underground, the composition being heat settable to a hard, tenaciously adherent film.

A further object of the invention is to provide an improved composition for protecting metallic surfaces in the presence of electrolytic conditions which would otherwise cause disbonding.

I have now discovered that the disbonding tendencies of impervious coatings based on polybutadiene materials can be substantially overcome if not entirely eliminated by including in the composition an anhydride of a polycarboxylic organic acid and phosphoric acid. Specifically, I have found that when such an anhydride is present in an amount up to about 25% by weight of the polymer solids present, and the phosphoric acid is present in an amount up to about 2% by weight of the solids, the resulting coating is resistant to cathodic disbonding even in the presence of substantial overvoltages. The greatest improvement occurs when the anhydride is present in an amount of from 2.5 to 5.0% of the copolymer solids, and the phosphoric acid is present in an amount of from 0.5 to 1.0% of the solids.

The improvement in resistance to cathodic disbonding occurrs when the anhydride and the phosphoric acid are added to various polybutadiene based polymers. For example, the anhydride and the phosphoric acid may be added to straight polybutadiene polymers, particularly those having a molecular weight on the order of 400 to 5,000 before curing. The additives of the present invention, however, are best suited for use in conjunction with butadiene-styrene copolymers in the form of commercially available drying oils embodying a partly oxidized butadiene-styrene copolymer. These materials are sold commercially under the trademarks "Buton 100," "Buton 150," "Buton 200" and "Buton 300." Compositions of this type also contain a mixture of solvents, particularly xylenes, and an aliphatic alcohol such as isopropanol. The butadiene-styrene copolymers of these commercial products contain about 75 to 85% by weight of butadiene and 15 to 25% styrene. They may be prepared in a number of manners including reaction of the monomers in the presence of sodium. The copolymers may contain hardness modifying agents such as maleic acid, fumaric acid, thioglycolic acid, thiosalicylic acid, mercaptophthalic acid, itaconic acid, mesaconic acid, citreconic acid, acrylic acid or esters thereof in small amounts. They may also contain small amounts of alkylated phenols or other promoters. The copolymers may also contain certain modifiers such as acrylic nitriles, alkyl acrylates, vinyl acetate, vinyl ketones, cinnamaldehyde, and the like.

The butadiene and styrene may be copolymerized in the presence of sodium and a reaction diluent such as an aliphatic hydrocarbon at temperatures ranging from about 25° C. to 95° C. The copolymers are then partially oxidized, usually by air-blowing, until the material absorbs from about 5% to 20% of its weight in oxygen. This partial oxidation results in the production of polar groups in the molecule, including hydroxyl groups and carboxyl groups. The partly oxidized material is sufficiently acid to have an acid number of about 5 to 18. The copolymer is dissolved in an aromatic hydrocarbon solvent during oxidation by blowing. Some of the solvent is then stripped off leaving a solids content of about 58 to 60%. Enough isopropanol is then added to produce a composition having about 50% solids.

The partly oxidized copolymer is preferably combined with an unoxidized copolymer of the same general description, that is, a butadiene-styrene copolymer having from 75 to 85% butadiene and 15 to 25% styrene. This material is substantially non-acid, as indicated by its acid number of about 0. It exists as a viscous liquid which is highly unsaturated, having an iodine number of about 300. Its molecular weight ranges up to about 5,000, and typically may extend from 400 to 5,000. When the unoxidized copolymer is combined in an amount of 5 to 40% by weight with 60 to 95% by weight of the partially oxidized copolymer, substantially greater amounts of solids can be deposited on the article to be coated, and the resulting coating is less brittle than occurs through the use of the partly oxidized copolymer alone.

As explained in my copending application Serial No. 255,647, filed February 1, 1963, and now Patent No. 3,170,806, the combination of the unoxidized and partly oxidized materials provides improved results despite the fact that the two materials are normally considered incompatible. Nevertheless, if the materials are mixed and heated to a temperature of 120 to 150° F. before application, the unoxidized material will become dispersed in the partly oxidized material and its solvent to a degree which is sufficient to deposit greater amounts of solids on the article to be coated. The resulting coating is also benefited to the extent of being more flexible, having a higher impact strength, and the like, then coatings produced through the use of each of the ingredients individually.

Suitable solvents for the partly oxidized material include alkanols such as isopropanol and ethanol, petroleum naphthas having a boiling range of about 90 to 120° F., straight run mineral spirits having a boiling range of about 125 to 200° C., or hydrocarbons such as butane, pentane, benzene, toluene, xylene, cyclohexane, butenes, pentenes, chlorinated solvents or the like, alone or in admixture. A sufficient amount of solvent is present to provide a consistency suitable for the type of application which is to be used. Where the material is to be sprayed, the solvent will normally be present in amounts from 33 to 100 parts by weight for every 100 parts by weight of the incompletely copolymerized solids.

The coating composition may also include additives such as pigments or extenders which can be present in amounts ranging from about 3 to 8% by weight of the composition.

The anhydride which may be employed is preferably one which has a cyclic (aromatic or cycloaliphatic) structure and includes at least about 8 carbon atoms per molecule. While the lower polycarboxylic anhydrides such as maleic anhydride can be used, I prefer to use the higher molecular weight materials such as tetrachlorophthallic anhydride, dodecylsuccinic anhydride, hexahydrophthallic anhydride, tetrahydrophthallic anhydride, chlorendic anhydride, trimellitic anhydride, and the commercial composition known as "Nadic Methyl Anhydride" (methylbicyclo (2,2,1) heptene-2,3-dicarboxylic anhydride isomers). Of the foregoing, the tetrahydrophthallic and the chlorendic anhydride appear to provide the best results. The anhydride is conveniently added as a 50% solution in ethanol.

The phosphoric acid is preferably added as a solution of about 25% concentration of orthophosphoric acid in ethanol.

Surprisingly, the use of the organic anhydride alone in the coating compositions does not appear to be significantly beneficial. The use of phosphoric acid alone is beneficial to some extent but the greatest benefit is derived when the two are used in combination in the amount stated previously. The effectiveness of the anhydride persists even above the preferred maximum limit of 5%, but with slightly less beneficial results. When the anhydride concentration is extended to about 10%, the effectiveness of the anhydride-phosphoric acid combination is no greater than achieved through the use of phosphoric acid alone.

A specific example of coating composition which can be employed for the purposes of the present invention is given in the following table:

*Table*

| | Parts |
|---|---|
| Partly oxidized butadiene-styrene copolymers | 42.43 |
| Unoxidized butadiene-styrene copolymer | 7.57 |
| Chromium oxide pigment | 3.51 |
| Solvent: | |
| 3 parts "Solvesso 100" (xylene and toluene) 1 part isopropanol | 46.49 |
| Tetrahydrophthallic anhydride (as 50% solution in ethanol) | 3.0 |
| Phosphoric acid (as 25% solution in ethanol) | 2.5 |

In the above formulation, the tetrahydrophthallic anhydride constituted 3% and the phosphoric acid constituted 1.25%, respectively, of the copolymer solids present in the composition.

The composition identified above was heated to a temperature in the range from 120 to 150° F. and applied to a metal surface which had been preheated to a temperature of about 400° F.

The presence of cathodic disbonding was measured in the following way. The coated sample was immersed in an electrolyte consisting of ½ normal sodium chloride, and had an impressed voltage of 2.5 volts. A ⅛-inch hole was drilled through the coating before immersion. The test continued for seven days and the disbonded area about the hole was measured after the loosened coating had been removed. It was found that coatings which included the anhydride-phosphoric acid combination evidenced little or no cathodic disbonding under these circumstances whereas the same type of coating composition without the anhydride-phosphoric acid mixture evidenced substantial undercoating under these conditions.

It should be evident that various modifications can be made to the described embodiments without departing from the scope of the present invention.

I claim as my invention:

1. A composition settable by heat into an impervious protective coating resistant to cathodic disbonding comprising a mixture of copolymers whose solids content contains from 5 to 40% of a butadiene-styrene copolymer containing from 75 to 85% butadiene and 15 to 25% styrene and from 60 to 95% of a partly oxidized butadiene-styrene containing from 75 to 85% butadiene and 15 to 25% styrene, in combination with from 2.5 to 5% an anhydride of a polycarboxylic organic acid and from 0.5 to 1.0% phosphoric acid.

2. A composition settable by heat into an impervious protective coating resistant to cathodic disbonding comprising a mixture of copolymers whose solids content contains from 5 to 40% of a butadiene-styrene copolymer containing from 75 to 85% butadiene and 15 to 25% styrene and from 60 to 95% of a partly oxidized butadiene-styrene copolymer containing from 75 to 85% butadiene and 15 to 25% styrene, in combination with an anhydride of a polycarboxylic organic acid in an amount up to about 25% by weight of the said solids content and phosphoric acid in an amount up to about 2% by weight of said solids content.

3. The composition of claim 1 in which said anhydride is tetrahydrophthallic anhydride.

4. The composition of claim 1 in which said anhydride is chlorendic anhydride.

References Cited by the Examiner

UNITED STATES PATENTS

| 2,652,342 | 9/1953 | Gleason | 260—346.6 |
| 2,798,009 | 6/1954 | Gault | 252—389 |
| 3,170,806 | 2/1965 | Svrchek | 260—33.4 |

MURRAY TILLMAN, *Primary Examiner.*

M. J. TULLY, *Assistant Examiner.*